(12) United States Patent
Lindoff et al.

(10) Patent No.: US 8,385,222 B2
(45) Date of Patent: Feb. 26, 2013

(54) METHOD AND APPARATUS FOR CHANNEL QUALITY DERIVATION

(75) Inventors: Bengt Lindoff, Bjärred (SE); Bo Bernhardsson, Lund (SE); Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 12/723,255

(22) Filed: Mar. 12, 2010

(65) Prior Publication Data

US 2011/0096680 A1    Apr. 28, 2011

Related U.S. Application Data

(60) Provisional application No. 61/254,790, filed on Oct. 26, 2009.

(51) Int. Cl.
*H04L 12/26* (2006.01)

(52) U.S. Cl. ............... 370/252; 370/328; 455/450

(58) Field of Classification Search ............... 370/252, 370/328; 375/260, 267, 299; 455/450
See application file for complete search history.

(56) References Cited

U.S. PATENT DOCUMENTS

| | | | |
|---|---|---|---|
| 7,116,981 B2 * | 10/2006 | Jeon et al. | 455/450 |
| 2005/0143062 A1 | 6/2005 | Dowling | |
| 2006/0007989 A1 | 1/2006 | Chen et al. | |
| 2007/0092012 A1 | 4/2007 | Wilhelmsson et al. | |
| 2007/0297324 A1 | 12/2007 | Lindoff et al. | |
| 2008/0130790 A1 * | 6/2008 | Forenza et al. | 375/299 |
| 2008/0298227 A1 | 12/2008 | Jonsson | |
| 2009/0296864 A1 | 12/2009 | Lindoff et al. | |
| 2010/0254474 A1 * | 10/2010 | Gomadam et al. | 375/267 |
| 2011/0085457 A1 * | 4/2011 | Chen et al. | 370/252 |

FOREIGN PATENT DOCUMENTS

GB    2443869 A    5/2008

OTHER PUBLICATIONS

Ho, K. et al. "Uplink Channel Estimation in WiMAX." IEEE Wireless Communications and Networking Conference, 2009 (WCNC 2009), Budapest, Hundary, Apr. 5-8, 2009.
3rd Generation Partnership Project. 3GPP TS 36.213, V8.8.0 (Sep. 2009). 3rd Generation Partnership Project; Technical Specification Group Radio Access Network; Evolved Universal Terrestrial Radio Access (E-UTRA); Physical layer procedures (Release 8).
3rd Generation Partnership Project. 3GPP TS 36.133, V9.1.0 (Sep. 2009). 3rd Generation Partnership Project; Technical Specification Group Radio Access Network; Evolved Universal Terrestrial Radio Access (E-UTRA); Requirements for support of radio resource management (Release 9).

* cited by examiner

*Primary Examiner* — Albert T Chou
(74) *Attorney, Agent, or Firm* — Coats & Bennett, P.L.L.C.

(57) ABSTRACT

In one aspect, a method and apparatus derive channel quality estimates for given subcarriers in an OFDM signal, based on reference signal (RS) or other known-signal measurements made for another set of subcarriers. In at least one embodiment, a wireless communication apparatus implements a method whereby it is configured for receiving reference information on the first set of subcarriers; generating the first channel quality estimates in the frequency domain, based on the received reference information; computing a power delay profile for the first set of subcarriers; and determining the second channel quality estimates either by extrapolating from the first channel quality estimates or as an average of the first channel quality estimates, depending on a delay spread of the power delay profile.

13 Claims, 5 Drawing Sheets

TABLE 1

QoS THRESHOLDS AND FILTER LENGTHS

| CELL BW (MHz) | FILTER LENGTH (ms) | QoS DETECTION THRESHOLD: REF. SYMBOL SINR (dB) | | |
|---|---|---|---|---|
| | | 1 TX ANTENNA | 2 TX ANTENNA | 3 TX ANTENNA |
| 1.4 | 400 | -3 | -4 | -5 |
| 3 | 400 | -4 | -5 | -6 |
| 5 | 200 | -5 | -6 | -6 |
| 10 | 200 | -5 | -6 | -6 |
| 15 | 200 | -5 | -6 | -6 |
| 20 | 200 | -5 | -6 | -6 |

*FIG. 4*

TABLE 2

IS THRESHOLDS AND FILTER LENGTHS

| CELL BW (MHz) | FILTER LENGTH (ms) | IS DETECTION THRESHOLD: REF. SYMBOL SINR (dB) | | |
|---|---|---|---|---|
| | | 1 TX ANTENNA | 2 TX ANTENNA | 3 TX ANTENNA |
| 1.4 | 300 | 0 | -1 | -2 |
| 3 | 300 | -1 | -2 | -3 |
| 5 | 100 | -2 | -3 | -3 |
| 10 | 100 | -2 | -3 | -3 |
| 15 | 100 | -2 | -3 | -3 |
| 20 | 100 | -2 | -3 | -3 |

*FIG. 5*

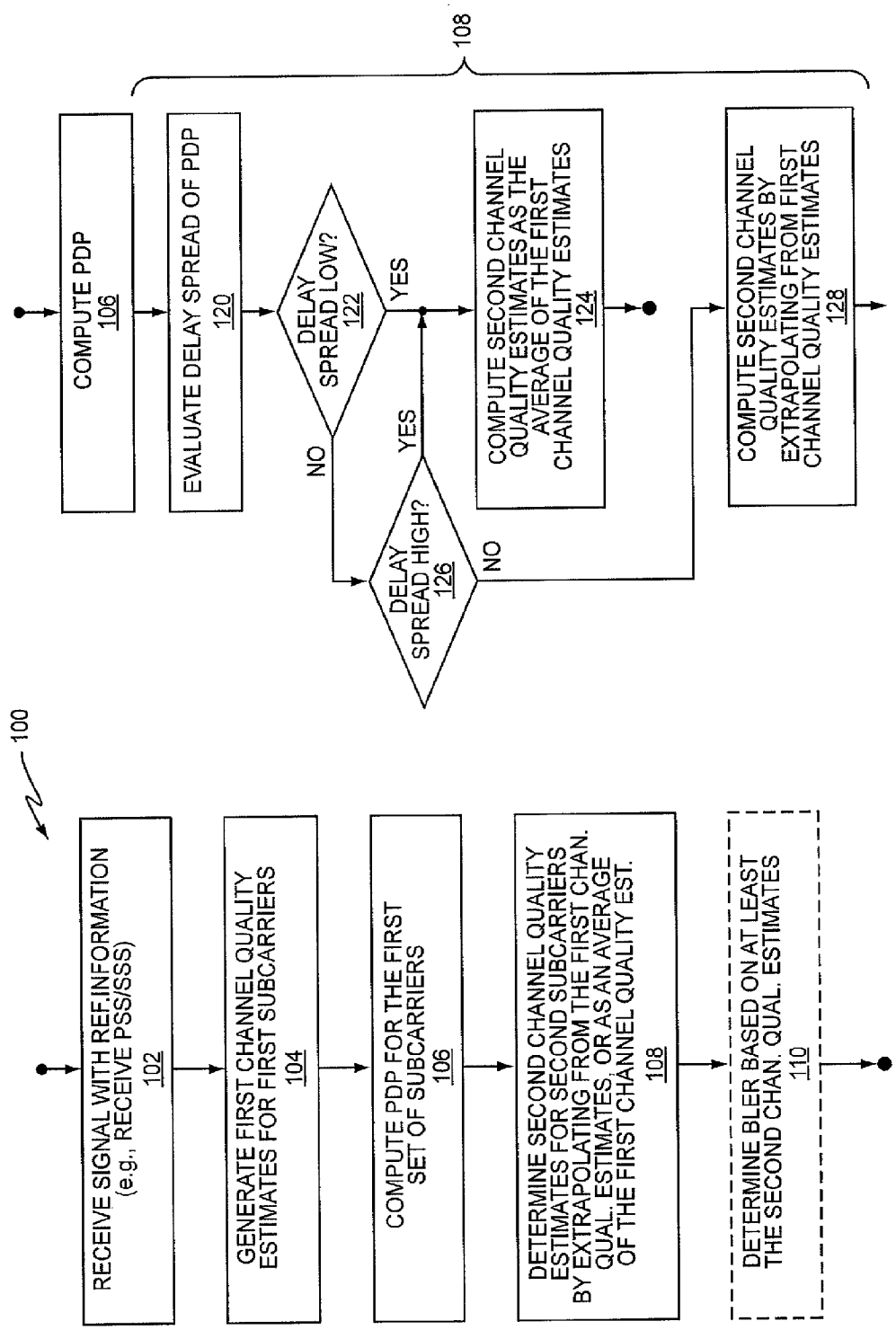

METHOD AND APPARATUS FOR CHANNEL QUALITY DERIVATION

RELATED APPLICATION

This application claims priority under 35 U.S.C. §119(e) to provisional application Ser. No. 61/254,790, filed 26 Oct. 2009 and titled "SIR extrapolation method." The entire contents of this related provisional application are incorporated herein by reference.

TECHNICAL FIELD

The present invention generally relates to communications signal processing, and particularly relates to deriving channel quality estimates for one set of subcarriers in an OFDM signal, based on channel quality estimates determined for another set of subcarriers.

BACKGROUND

Receiver synchronization and Radio Link Monitoring (RLM) support important functions in the typical wireless communication network. For example, in wireless communication networks operating according to Long Term Evolution (LTE) standards, (primary and secondary) synchronization signals transmitted from eNBs allow mobile terminals or other items of User Equipment (UE) to detect and synchronize with new cells, for signal quality/strength measurements that enable good handover (HO) decisions. Similarly, RLM allows individual terminals to detect radio link failure and other communications problems, and take or otherwise trigger appropriate actions, such as reconnection or link recovery processing.

However, for a number of reasons including energy efficiency on the network side and battery life improvements on the terminal side, the developing wireless communication standards make increasing use of DTX (discontinuous transmission) and/or DRX (discontinuous reception). For example, in LTE the eNBs may DTX to save power, or for other reasons, and, likewise, the UEs may use DRX, both of which complicate channel quality estimations due to limited measurement opportunity. In the LTE standard, the RLM function requires UE to regularly monitor the serving cell quality and based on the estimated quality detect "in sync" and "out of sync" status of the radio link of the serving cell. The reference signals are used to derive the serving cell quality for the purpose of the RLM. The power saving in LTE eNB may lead to reduction in reference signal transmission and would therefore negatively impact the RLM performance.

SUMMARY

In one aspect, the teachings presented herein advantageously provide for deriving channel quality estimates for given subcarriers in an OFDM signal, based on reference signal (RS) measurements made using other subcarriers. In at least one embodiment, for example, a receiver directly calculates channel quality estimates using RSs received on Resource Blocks (RBs) corresponding to Primary and/or Secondary Synchronization Signals, which signals are transmitted even when the eNB is operating in DTX. The receiver then uses those channel quality measurements to derive channel quality estimates for other RBs in the OFDM signal, such as those used for a Physical Dedicated Data Channel (PDDCH) or other physical layer channel.

More broadly, one embodiment of the teachings herein provides a method in a wireless communication apparatus of using first channel quality estimates determined for a first set of subcarriers in an OFDM signal to derive second channel quality estimates for a second set of subcarriers in the OFDM signal. The method includes receiving reference information on the first set of subcarriers; generating the first channel quality estimates in the frequency domain, based on the received reference information; computing a power delay profile for the first set of subcarriers; and determining the second channel quality estimates either by extrapolating from the first channel quality estimates or as an average of the first channel quality estimates, depending on a delay spread of the power delay profile.

For example, if the apparatus deems the delay spread ("dispersion") to be low or high, as indicated by the PDP, it derives the second channel quality estimates from the first channel quality estimates using an averaging process. On the other hand, if the apparatus deems the delay spread to be moderate, e.g., lying between defined low and high dispersion thresholds, it derives the second channel quality estimates from the first channel quality estimates using an extrapolation process.

In another embodiment, the present invention provides a wireless communication apparatus that is configured to use first channel quality estimates determined for a first set of subcarriers in an OFDM signal to derive second channel quality estimates for a second set of subcarriers in the OFDM signal. The wireless communication apparatus comprises, for example a mobile terminal or other item of User Equipment (or comprises a network-side receiver). In any case, the apparatus includes: a receiver configured to receive reference information on the first set of subcarriers; a first channel quality estimator configured to generate the first channel quality estimates in the frequency domain, based on the received reference information; a power delay profile calculator configured to compute a power delay profile for the first set of subcarriers; and a second channel quality estimator configured to determine the second channel quality estimates either by extrapolating from the first channel quality estimates or as an average of the first channel quality estimates, depending on a delay spread of the power delay profile. The apparatus also may include a Block Error Rate (BLER) estimator that estimates a BLER with respect to the second set of subcarriers, based at least on the second channel quality estimates—BLER estimation may use both the first and second channel quality estimates.

Of course, the present invention is not limited by the above brief summary of features and advantages. Those of ordinary skill in the art will recognize additional features and advantages upon reading the following detailed description, which highlights several example embodiments, and upon viewing the accompanying drawings.

BRIEF DESCRIPTION OF THE DRAWINGS

FIGS. 4 and 5 illustrate example tables of thresholds and filter lengths as a function of downlink cell bandwidth and transmitter antenna configuration for out-of-sync and in-sync conditions, respectively.

FIGS. 6 and 7 are logic flow diagrams of embodiments of a processing method for deriving second channel quality estimates (for a second set of subcarriers in an OFDM signal) from the channel quality estimates determined for a first set of subcarriers in the OFDM signal.

DETAILED DESCRIPTION

Figure 1:
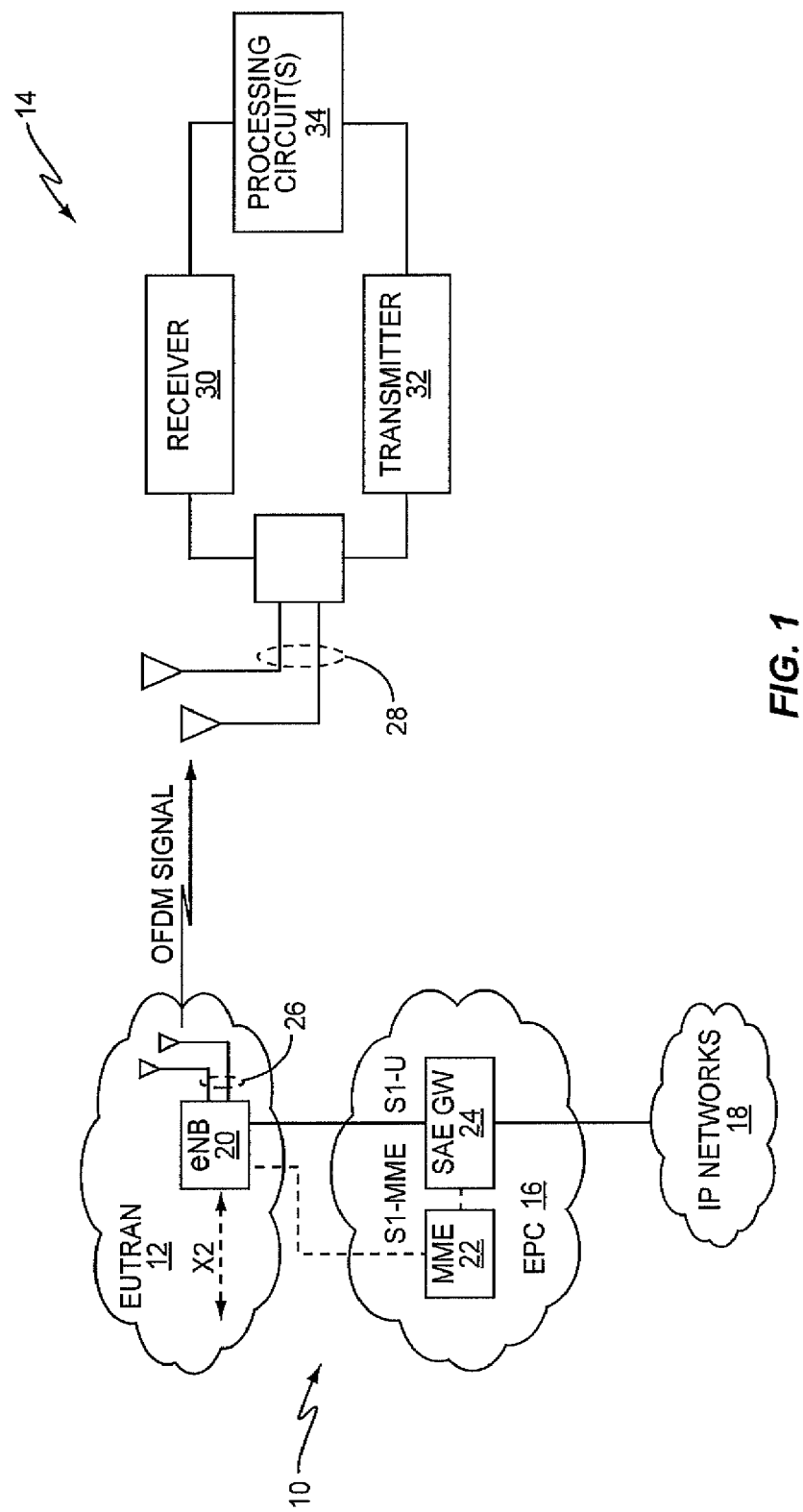
FIG. 1 is a block diagram of one embodiment of a wireless communication network and an associated wireless communication terminal as an example apparatus.

As a non-limiting example, FIG. 1 illustrates an embodiment of a wireless communication network 10 that includes a Radio Access Network (RAN) 12 that is configured to communicatively couple one or more mobile terminals 14 to a Core Network (CN) 16, which in turn communicatively couples to one or more (external) Internet Protocol (IP) networks 18. In particular, the RAN 12 provides downlink service based on its transmission of one or more Orthogonal Frequency Division Multiplex (OFDM) signals to the terminal(s) 14.

Using the Long Term Evolution (LTE) network standards as an example, FIG. 1 depicts the RAN 12 as an "Evolved UMTS Terrestrial RAN" or E-UTRAN that includes an "evolved NodeB" or eNB 20. The CN 16 appears as an "Evolved Packet Core" or EPC that includes a "Mobility Management Entity" or MME 22 and a "System Architecture Evolution Gateway" or SAE GW 24. For additional introductory information about LTE, one may refer to the ERICSSON White Paper entitled "LTE—an introduction," Document No. 284 23-3124 Uen, Rev. B, June 2009.

However, as those of ordinary skill in the relevant art will be familiar with LTE network generalities, this discussion focuses on the novel and inventive channel quality estimation contemplated in this disclosure. To that end, the terminal 14 stands as a non-limiting example of a wireless communication apparatus that is configured to use first channel quality estimates determined for a first set of subcarriers in an OFDM signal to derive second channel quality estimates for a second set of subcarriers in the OFDM signal. For example, the eNB 20 includes one or more transmit antennas 26 and uses them to transmit a (downlink) OFDM signal to the terminal 14, which includes one or more receive antennas 28, for receiving the transmitted OFDM signal.

The terminal 14 also includes a receiver 30, a transmitter 32, and one or more associated processing circuit(s) 34. The receiver 30 is configured to receive reference information on the first set of subcarriers. As an example, the receiver 30 includes circuits for amplification, filtering, gain control, down-conversion, and digitization, to produce digital sample streams corresponding to the OFDM signal received on the antenna(s) 28.

Figure 2:
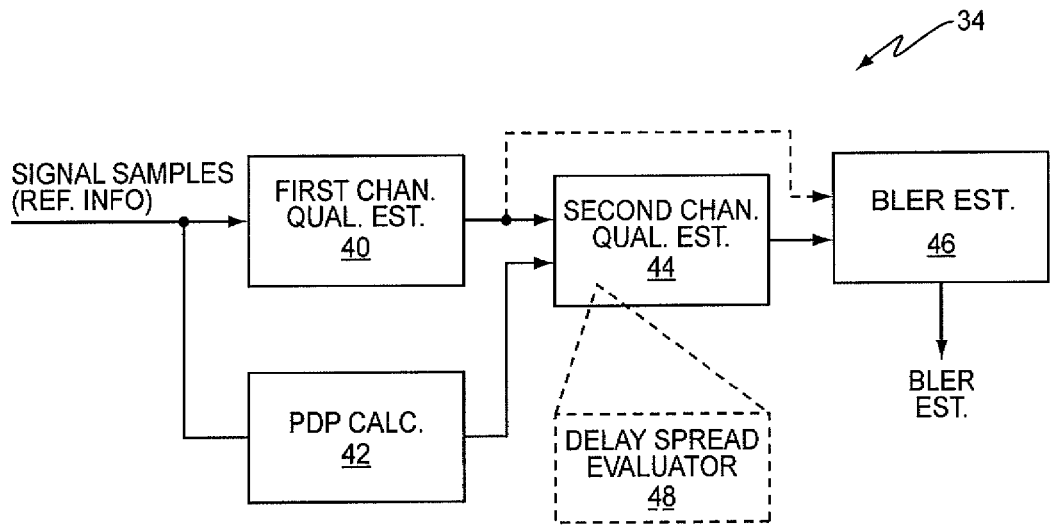
FIG. 2 is a block diagram of one embodiment of processing circuits implemented in the wireless communication terminal of FIG. 1.

Correspondingly, as an example embodiment, the one or more processing circuits 34 are configured according to FIG. 2, wherein they comprise a first channel quality estimator 40 that is configured to generate the first channel quality estimates in the frequency domain, based on the received reference information; a power delay profile calculator 42 that is configured to compute a power delay profile for the first set of subcarriers; and a second channel quality estimator 44 that is configured to determine the second channel quality estimates either by extrapolating from the first channel quality estimates or as an average of the first channel quality estimates, depending on a delay spread of the power delay profile. Further, in at least one embodiment the one or more processing circuits 34 include a Block Error Rate (BLER) estimator 46, which will be described later.

In one embodiment, the second channel quality estimator 44 is configured to determine the second channel quality estimates as the average of the first channel quality estimates, when the value of the delay spread is outside a defined range of delay spread values. The second channel quality estimator 44 is further configured to determine the second channel quality estimates by extrapolating from the first channel quality estimates, when the value of the delay spread is in the defined range of delay spread values. Thus, the second channel quality estimator 44 may be understood as dynamically and automatically changing between derivation modes: a first mode wherein it derives the second channel quality estimates by averaging the first channel quality estimates; and a second mode wherein it derives the second channel quality estimates by extrapolating from the first channel quality estimates.

Correspondingly, in at least one embodiment, the second channel quality estimator 44 includes or is operatively associated with a delay spread evaluator 48 having access to stored values defining one or more dispersion threshold values for evaluating the delay spread. The delay spread evaluator 48 is configured to provide an indication to the second channel quality estimator 44 as to whether it (the estimator 44) should determine the second channel quality estimates as the average of the first channel quality estimates, or by extrapolating from the first channel quality estimates.

Figure 3:
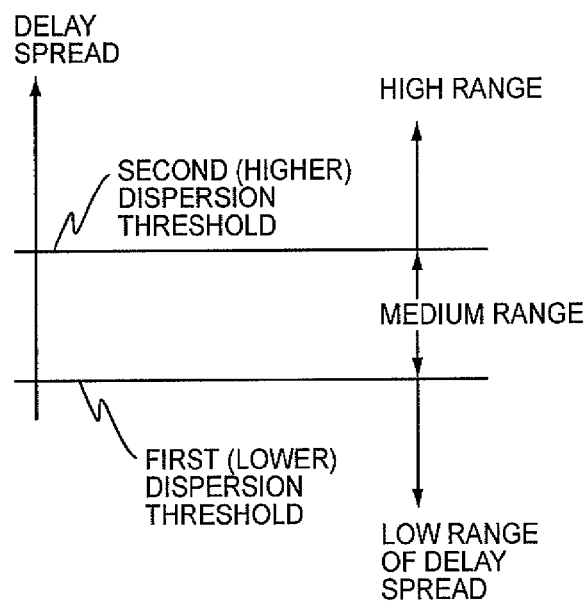
FIG. 3 is a diagram of one embodiment of low and high dispersion threshold definitions, for use in defining delay spread ranges on which control decisions are taken with respect to the processing used in deriving second channel quality estimates from first channel quality estimates.

FIG. 3 illustrates an example of this processing, wherein one sees delay spread ("channel dispersion") split into three ranges or categories: (1) a low range that is at or below a first (numeric) threshold representing a given amount or degree of channel dispersion; (2) a high range that is at or above a second (numeric) threshold representing a given amount or degree of channel dispersion; and (3) a medium or middle range that lies between the first and second dispersion thresholds. The numbers defining these thresholds can be pre-stored in non-volatile memory in a receiver, e.g., as part of a factory configuration, and/or they can be determined or revised during live operation, such as by monitoring one or more aspects of receiver performance with respect to the derivation modes over changing channel conditions.

Regardless, the logical construct shown in the example of FIG. 3 embodies an advantageous principal that is recognized in this disclosure. Namely, first channel quality estimates for a first set of subcarriers in an OFDM signal may be obtained directly, e.g., by carrying out measurements based on reference signals received on the first set of subcarriers. Next, assuming that a second set of subcarriers lack reference or other known signal content that would support direct estimation of channel quality for them, the disclosed receiver processing advantageously derives channel quality estimates for the second set of subcarriers using the first channel quality estimates. However, the receiver performs the derivation intelligently, in view of the prevailing conditions—e.g., it derives the second channel estimates through an averaging process or through an extrapolation process in dependence on which approach is determined to be better suited for the prevailing propagation channel conditions.

Thus, when the propagation channel exhibits relatively low or high dispersion, as can be defined using fixed or adjustable dispersion thresholds, derivation of the second channel quality estimates uses averaging of the first channel quality estimates. On the other hand, when the channel exhibits intermediate levels of dispersion, derivation of the second channel quality estimates uses an extrapolation process that at least partially accounts for the difference in frequencies between the first and second sets of subcarriers.

Therefore, in at least one embodiment, the second channel quality estimator 44 is configured to determine the second channel quality estimates as the average of the first channel quality estimates when the value of the delay spread—as determined from the PDP—is below a first dispersion threshold or above a higher, second dispersion threshold, and to determine the second channel quality estimates by extrapolating from the first channel quality estimates when the value of the delay spread is between the first and second dispersion thresholds.

In terms of operation, then, in at least one embodiment, it will be understood that the second channel quality estimator 44 is configured to derive the second channel quality estimates by extrapolating from the first channel quality estimates, during times when channel dispersion is in an intermediate range, and derive the second channel quality estimates by averaging the first channel quality estimates, during times when the channel dispersion is below or above the intermediate range. As such, the mobile terminal 14 or other apparatus may be configured to dynamically change between a first mode wherein the second channel quality estimates are determined by averaging the first channel quality estimates, and a second mode wherein the second channel quality estimates are determined by extrapolating (in the frequency domain) from the first channel quality estimates.

Also, as noted, what constitutes the first or second set of subcarriers may depend upon the channel definitions or signaling associated with them. In an advantageous example, the first set of subcarriers convey known reference information, making them suitable for use in direct estimation of channel quality, which may then be used to derive channel quality information for the second set of subcarriers. In at least one embodiment, a physical layer channel is transmitted at least on the second set of subcarriers, and the terminal 14 or other apparatus further comprises a Block Error Rate (BLER) estimator—such as BLER estimator 46 shown in FIG. 2—that is configured to estimate a BLER for the physical layer channel based on the first and second channel quality estimates. And, as will be detailed later, the BLER estimator 46 also may be configured to determine the BLER further as a function of the number of antennas used for transmitting to the terminal 14.

In providing a non-limiting example of the above process, one may use channel estimates (as an example). First the channel estimated from measurements made for the first set of subcarriers is extrapolated to the second subset (using methods described below). Additionally, the interference is extrapolated. Note that interference estimates for the second set of subcarriers may be obtained via averaging, or by extrapolating. In any case, it may be assumed that there is at least one channel quality measure for the first set of subcarriers—e.g., SIR1—and at least one (derived) channel quality measure for the second set of subcarriers—e.g., SIR2.

Of course, there may be multiple quality estimates for the first set of subcarriers, which are used to derive corresponding multiple quality estimates for the second set of subcarriers. For example, the terminal 14 or other receiver may estimate channel quality for each OFDM resource block (associated with the first set of subcarriers), to obtain $SIR1\_1$, $SIR1\_2$, etc., and then use those plural values to derive $SIR2\_1$, $SIR2\_2$, etc. Then, a logarithmic average is made, for example, to obtain an effective SIR—i.e., an SIR corresponding to an AWGN channel. One way to compute an effective SIR from multiple SIR values is $SIR\_eff=\log(sum\_i(\exp(-SIR\_i)))$. Thus, in one or more embodiments, the receiver is configured to compute a log average, to determine $SIR\_eff1$ for the first set of subcarriers and $SIR\_eff2$ for the second set of subcarriers, and then compute a final $SIR\_eff$ including $SIR\_eff1$ and $SIR\_eff2$.

This final effective SIR is mapped to a BLER using one or more SIR to BLER functions that account for different bandwidth (BW) and antenna setups, etc. Such function(s) can be simulated or otherwise determined beforehand and stored in a look up table in the receiver memory. The pending, co-owned patent application published as U.S. 2009/0296864 A1 includes tables with examples of out-of-sync/in-sync tables for different BW and antenna setups, which can be understood as SIR values that correspond to PDCCH BLER for in and out-sync. While U.S. 2009/0296864 A1 is incorporated herein by reference, its example tables are reproduced herein for convenience, as FIGS. 4 and 5. In particular, Table 1 of FIG. 4 illustrates example OoS (out-of-sync) thresholds and filter lengths as a function of downlink cell bandwidth and transmitter antenna configuration. Similarly, Table 2 in FIG. 5 illustrates example IS (in-sync) thresholds and filter lengths as a function of downlink cell bandwidth and transmitter antenna configuration.

In one embodiment, the terminal 14 or other apparatus is configured for operation in an LTE communication network 10. In at least one such embodiment, the first set of subcarriers correspond to a Primary or Secondary Synchronization Signal (PSS or SSS) transmitted by the eNB 20, and the second set of subcarriers is outside the first set of subcarriers. In a particular example of this scenario, a Physical Downlink Control Channel (PDCCH) is transmitted on the first and second sets of subcarriers, and the terminal 14 is configured to determine the first channel quality estimates from reference signals received via the PSS or SSS, and extrapolate from or average those first channel quality estimates to obtain the second channel quality estimates for the PDCCH. One or more embodiments of the terminal 14 further estimate a Block Error Rate (BLER) for the PDCCH based on at least the second channel quality estimates.

FIGS. 6 and 7 illustrate embodiments of a processing method related to the above details, which may be implemented by the terminal 14 or another wireless communication apparatus. As an example, the processing circuits 34 of the terminal 14 include one or more microprocessors, digital signal processors, or other type of digital processing circuit that is configured at least partially through its execution of stored computer program instructions to carry out the illustrated processing. Non-volatile memory or other computer-readable medium storing such computer program instructions thus may be included in the processing circuits 34, or otherwise be accessible to them.

The processing method 100 illustrated in FIG. 6 is a method wherein a wireless communication apparatus uses first channel quality estimates determined for a first set of subcarriers in an OFDM signal to derive second channel quality estimates for a second set of subcarriers in the OFDM signal. According to the illustrated embodiment, the method 100 includes: receiving reference information on the first set of subcarriers (Step 102); generating the first channel quality estimates in the frequency domain, based on the received reference information (Step 104); computing a power delay profile for the first set of subcarriers (Step 106); and determining the second channel quality estimates either by extrapolating from the first channel quality estimates or as an average of the first channel quality estimates, depending on a delay spread of the power delay profile (Step 108). The method in one or more embodiments further includes determining a BLER for second set of subcarriers, based at least on the second channel quality estimates (Step 110).

FIG. 7 illustrates specific details for Step 108 of method 100, after computation of the PDP (Step 106). Here, Step 108 comprises evaluating the delay spread as indicated by the PDP (Step 120). If the delay spread is "low" ("Yes" from Step 122), processing continues with computing the second channel quality estimates as the average of the first channel quality estimates (Step 124). However, if the delay spread is not low ("No" from Step 122), processing continues with determining whether the delay spread is "high" (Step 126). If so, processing continues with Step 124. If not—i.e., the delay spread is not high or low—processing continues with Step 128, which includes computing the second channel quality estimates by extrapolating from the first channel quality estimates.

Thus, the processing of FIG. 7 can be understood as determining the second channel quality estimates as the average of the first channel quality estimates, when the value of the delay spread is outside a defined range of delay spread values; and determining the second channel quality estimates by extrapolating from the first channel quality estimates, when the value of the delay spread is in the defined range of delay spread values. As was shown in FIG. 3, high, low, and medium ranges of delay spread may be defined using predetermined or dynamically adjustable numeric values that define high and low dispersion thresholds.

Taking a working example of the earlier-described terminal 14 in the context of the above-described processing methods, the terminal 14 receives OFDM symbols containing synchronization signals (PSS or SSS or both) from a serving cell in the network 10. The terminal 14 FFT (Fast Fourier Transform) processes the signal to a frequency domain representation, according to well known principles in the art. Then the terminal estimates channel quality for the subset of Resource Blocks (RBs) in the OFDM time-frequency grid that contains the synchronization signals. These first channel quality estimates may, for example, take the form of channel estimates, signal-to-interference ratio (SIR), and/or signal power estimates.

Figure 8:
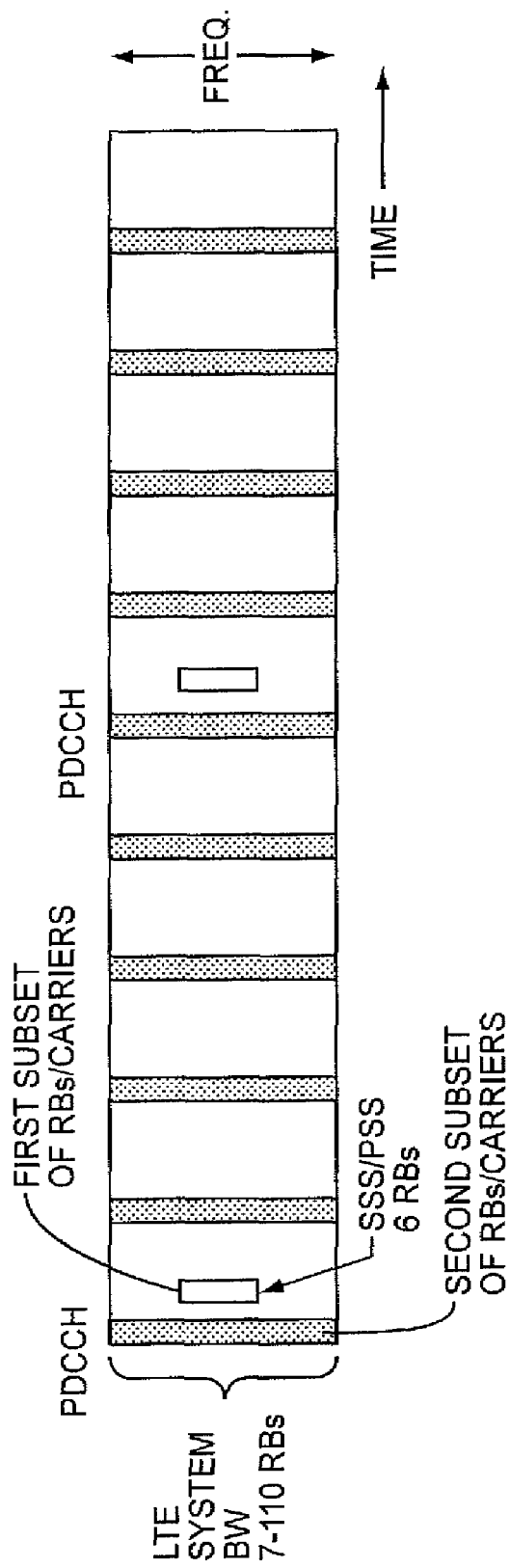
FIG. 8 is a diagram of a typical arrangement of selected Resource Blocks (RBs) within the time-frequency grid of an LTE-based OFDM signal.

The terminal 14 further computes the power delay profile (PDP), for example, by correlating the time domain representation of the PSS/SSS belonging to the serving cell to the received time domain signal, such as by using a matched filter, which is a well known technique in the art. Then, depending on the PDP, the terminal 14 computes second channel quality estimates for a second subset of RBs not containing the PSS/SSS. This second subset of RBs could for instance be all RBs of interest to the terminal except the RBs containing PSS/SSS. See the example of FIG. 8.

To extrapolate channel information in the frequency direction one method is to build a ray-based channel model of the form $$C(t,f) = \Sigma \alpha_n(t) \exp(j2\pi(f_{D_n}(t)t - \tau_n(t)f) + \theta_n).$$

Here the time-dependence of the parameters can be assumed slower than the fast fading and can therefore be estimated on a slower time scale. One method for doing the parameter estimation for the above equation is described in the commonly-owned and co-pending published patent application U.S. 2007/0092012 A1, "Method and apparatus for communication channel estimation," to Wilhelmsson, et al. The channel can typically be extrapolated in the order of 1-2 channel correlation bandwidths. Hence better extrapolation will be obtained for channels with small to medium delay spread, such as the ITU-R Pedestrian A channel. Also prediction accuracy improves with lower speeds.

While the U.S. 2007/0092012 A1 publication to Wilhelmsson is incorporated herein by reference, select example details from that application are provided for convenience. In particular, for a better understanding of example channel frequency response prediction in more detail, it is helpful to observe that for multipath reception a received complex baseband signal may be represented as $$r(t) = \sum_{n=1}^{N} \alpha_n(t) s(t - \tau_n(t)) e^{j(2\pi f_{D_n}(t)t + \theta_n)}, \qquad \text{Eq. (1)}$$

where the subindex n corresponds to signal path n, and N represents the total number of paths, i.e., multipath signal copies. Eq. (1) implies that the baseband channel can be modeled as a linear time-variant filter with the equivalent baseband impulse response, given as $$c(t, \tau) = \sum_{n=1}^{N} \alpha_n(t) e^{j(2\pi f_{D_n}(t)t + \theta_n)} \delta(\tau - \tau_n(t)), \qquad \text{Eq. (2)}$$

at time $t-\tau$, where t represents real time and $\tau$ represents time within the impulse response.

The time variant frequency response of the channel is obtained by taking the Fourier transform with respect to $\tau$, given as, $$\begin{aligned} C(t, f) &= \int_{-\infty}^{\infty} c(t, \tau) e^{-j2\pi f \tau} d\tau \\ &= \int_{-\infty}^{\infty} \left[ \sum_{n=1}^{N} \alpha_n(t) e^{j(2\pi f_{D_n}(t)t + \theta_n)} \delta(\tau - \tau_n(t)) \right] e^{-j2\pi f \tau} d\tau \\ &= \sum_{n=1}^{N} \alpha_n(t) e^{j(2\pi f_{D_n}(t)t + \theta_n)} e^{-j2\pi f \tau_n(t)} \\ &= \sum_{n=1}^{N} \alpha_n(t) e^{j(2\pi(f_{D_n}(t)t - \tau_n(t)f) + \theta_n)}, \end{aligned} \qquad \text{Eq. (3)}$$

where $\alpha_n(t)$ represent the (multipath) attenuations, $$f_{D_n}(t) = f_c \frac{v}{c} \cos\beta_n(t)$$

represent the Doppler shifts, and $$\tau_n(t) = \frac{L_n(t)}{c}$$

represent the excess (multipath) delays.

Eq. (3) may be understood as representing the sum of N cos( ) and sin( ) functions over a range of frequencies. For an example, if the carrier frequency $f_c=2$ GHz, and the vehicle (device) speed $v=110$ km/h, then the maximum Doppler frequency $f_{Dmax}=200$ Hz. In any case, the equation illustrates the duality of the time and frequency dependencies, i.e., the frequency response changes if $f_{D_n}(t) \neq 0$ or $\tau_n(t) \neq 0$, because of the products $f_{D_n}(t)t$ and $\tau_n(t)f$ appearing in the equation. Also, one can see that this expression is a sum of $\sin(\cdot)$ and $\cos(\cdot)$ with different Doppler and excess delay differences, $f_{D_n}(t) - f_{D_m}(t)$ $\tau_n(t) - \tau_m(t)$, and phases $\theta_n - \theta_m$.

Assuming that one observes the channel over a limited time window, e.g., at a given instant of time, but over a range of frequencies, the extent that the channel changes across frequency depends on the different delays. It is also noted that if the complex amplitudes and the delays can be perfectly estimated for all the N paths, then the transfer function of the channel would be perfectly known for all frequencies. That is, with the expression for the baseband channel frequency response given in Eq. (3), one need only substitute the value f in the equation for a given frequency of interest to predict the channel frequency response at that frequency.

With C[m,k] representing C(t,f) sampled with symbol rate and (pilot) sub carrier spacing, the transfer function may be represented as $$R[m,k] = C[m,k]S[m,k] + N[m,k] \quad \text{Eq. (4)}$$

where R[m,k] represents the received symbol, C[m,k] represents the channel frequency response, S[m,k] represents the transmitted symbol, and N[m,k] represents the noise plus interference. At the pilot sample rate—i.e., at the pilot sub carrier frequency interval—and assuming the pilots equal to one and that the channel parameters are time invariant over a comparatively small time interval, one may derive the auto regression (AR) model from R [n], where n=1, ..., L and the time index has been suppressed for notational convenience. That is, the channel frequency response measurements for L received pilots or other received reference values may be used to determine the AR model, thereby providing a basis for predicting the channel frequency response for one or more subcarriers at other frequencies.

Assuming a unity pilot and that pilot sub carriers are received at frequencies {N, N−1, ..., N+1−p}, the channel frequency response, $\hat{C}[N+1]$, for the next adjacent (but not received) pilot sub carrier frequency can be predicted using an AR model of order p as, $$\hat{C}[N+1] = -a[1]R[N] - a[2]R[N-1] - \ldots - a[p]R[N+1-p] \quad \text{Eq. (5)}$$

where {a[1], a[2], ..., a[p]} are the AR model coefficients. To obtain further predicted channel frequency responses at the pilot sub carrier frequency interval, one may iterate the AR model using results obtained from the previous iteration as follows $$\hat{C}[N+1] = -a[1]R[N] - a[2]R[N-1] - \ldots - a[p]R[N+1-p] \quad \text{Eq. (6)}$$

$$\hat{C}[N+2] = -a[1]\hat{C}[N+1] - a[2]R[N] - \ldots - a[p]R[N+2-p]$$

$$\vdots$$

$$\hat{C}[N+m] = -a[1]\hat{C}[N+m-1] - \ldots - a[p]\hat{C}[N+m-p].$$

Thus, with Eq. (5) and Eq. (6) in mind, one sees that received signal samples can be used to calculate channel frequency responses for received signal frequencies and those measured responses can be used to determine AR model coefficients for a p-th order AR model. With the model coefficients thus determined using channel frequency responses for a first set of subcarriers at given received signal frequencies, the AR model can then be used to predict channel frequency responses for a second subset of subcarriers at given other signal frequencies.

Thus, in one or more embodiments, the terminal 14 uses known, reference information received on a first set of subcarriers, develops an AR model, and uses that AR model to predict channel response at other subcarrier frequencies of interest (at least when channel conditions favour extrapolation of this sort). Still further, the terminal 14 in one or more embodiments computes a hypothetical BLER based on at least the second channel quality estimates. For example, a BLER may be hypothesized for the second subset of RBs based on the first and second channel quality estimates. That calculation may also factor in the number of transmit antennas used to transmit to the terminal. Thus, as one advantage of the invention proposed herein the hypothetical PDCCH BLER for an LTE terminal can be derived from measurements and calculations made using the synchronization signals (PSS/SSS). The method can be used for any currently used LTE channel bandwidth, which can range, for example, from 7 RBs to 110 RBs.

The method(s) proposed herein also enables robust Radio Link Monitoring (RLM) even when a larger number of subframes are disabled or DTXed due to features like eNode B power saving or sub-frame blanking required in self backhauling relays. For example, the UE can use the synchronization signals (PSS/SSS) to measure the serving cell quality over the 7 RBs and use the invention to extrapolate it to an estimated value corresponding to a larger cell bandwidth (e.g. 50 RBs) actually used in the serving cell. The estimated value can then be used for radio link monitoring. In case of multiple transmit antennas used at the eNB, the UE can also extrapolate the measured value based on PSS/SSS to an estimated value corresponding to a larger cell bandwidth (e.g. 50 RBs) and the number of transmit antennas actually used at the eNB. Hence, the teachings herein also provide power-savings advantages relevant to the "Energy Saving" base station feature introduced in the 3GPP standard for LTE (Rel. 10).

Of course, the above identification of advantages is not limiting; those skilled in the art will recognize additional advantages of the present invention. Likewise, the present invention itself is not limited by the foregoing discussion, or by the accompanying illustrations. Indeed, the present invention is limited only by the presented claims and their legal equivalents.

What is claimed is:

1. A method in a wireless communication apparatus of using first channel quality estimates determined for a first set of subcarriers in an OFDM signal to derive second channel quality estimates for a second set of subcarriers in the OFDM signal, the method comprising:
    receiving reference information on the first set of subcarriers;
    generating the first channel quality estimates in the frequency domain, based on the received reference information;
    computing a power delay profile for the first set of subcarriers; and
    determining the second channel quality estimates depending on a delay spread of the power delay profile, by:
        determining the second channel quality estimates as the average of the first channel quality estimates, when the value of the delay spread is outside a defined range of delay spread values; and
        determining the second channel quality estimates by extrapolating from the first channel quality estimates, when the value of the delay spread is in the defined range of delay spread values.

2. The method of claim 1, wherein a physical layer channel is transmitted on at least the second set of subcarriers and further comprising determining a Block Error Rate (BLER) for the physical layer channel based on the first and second channel quality estimates.

3. The method of claim 2, further comprising determining the BLER further as a function of the number of antennas used for transmitting to the wireless communication apparatus.

4. A method in a wireless communication apparatus of using first channel quality estimates determined for a first set of subcarriers in an OFDM signal to derive second channel quality estimates for a second set of subcarriers in the OFDM signal, the method comprising:
- receiving reference information on the first set of subcarriers;
- generating the first channel quality estimates in the frequency domain, based on the received reference information;
- computing a power delay profile for the first set of subcarriers; and
- determining the second channel quality estimates depending on a delay spread of the power delay profile, by:
  - determining the second channel quality estimates as the average of the first channel quality estimates when the value of the delay spread is below a first dispersion threshold or above a higher, second dispersion threshold; and
  - determining the second channel quality estimates by extrapolating from the first channel quality estimates when the value of the delay spread is between the first and second dispersion thresholds.

5. A method in a wireless communication apparatus of using first channel quality estimates determined for a first set of subcarriers in an OFDM signal to derive second channel quality estimates for a second set of subcarriers in the OFDM signal, the method comprising:
- receiving reference information on the first set of subcarriers;
- generating the first channel quality estimates in the frequency domain, based on the received reference information;
- computing a power delay profile for the first set of subcarriers; and
- determining the second channel quality estimates either by extrapolating from the first channel quality estimates or as an average of the first channel quality estimates, depending on a delay spread of the power delay profile;
- wherein the first set of subcarriers corresponds to a Primary or Secondary Synchronization Signal (PSS or SSS) transmitted by an eNodeB in an Long Term Evolution (LTE) network;
- wherein the second set of subcarriers is outside of the first set of subcarriers; and
- wherein a Physical Downlink Control Channel (PDCCH) is transmitted on at least the second set of subcarriers; and
- wherein the method further comprises:
  - determining the first channel quality estimates from reference signals received via the PSS or SSS;
  - extrapolating from or averaging those first channel quality estimates to obtain second channel quality estimates for the PDCCH; and
  - estimating a Block Error Rate (BLER) for the PDCCH based on at least the second channel quality estimates.

6. A method in a wireless communication apparatus of using first channel quality estimates determined for a first set of subcarriers in an OFDM signal to derive second channel quality estimates for a second set of subcarriers in the OFDM signal, the method comprising:
- receiving reference information on the first set of subcarriers;
- generating the first channel quality estimates in the frequency domain, based on the received reference information;
- computing a power delay profile for the first set of subcarriers; and
- determining the second channel quality estimates depending on a delay spread of the power delay profile, by:
  - deriving the second channel quality estimates by extrapolating from the first channel quality estimates, during times when the delay spread is in an intermediate range; and
  - deriving the second channel quality estimates by averaging the first channel quality estimates, during times when the delay spread is below or above the intermediate range.

7. A wireless communication apparatus configured to use first channel quality estimates determined for a first set of subcarriers in an OFDM signal to derive second channel quality estimates for a second set of subcarriers in the OFDM signal, the wireless communication apparatus comprising:
- a receiver configured to receive reference information on the first set of subcarriers;
- a first channel quality estimator configured to generate the first channel quality estimates in the frequency domain, based on the received reference information;
- a power delay profile calculator configured to compute a power delay profile for the first set of subcarriers; and
- a second channel quality estimator configured to:
  - determine the second channel quality estimates as the average of the first channel quality estimates, when the value of a delay spread of the power delay profile is outside a defined range of delay spread values; and
  - determine the second channel quality estimates by extrapolating from the first channel quality estimates, when the value of the delay spread is in the defined range of delay spread values.

8. The apparatus of claim 7, wherein a physical layer channel is transmitted on at least the second set of subcarriers and wherein the apparatus further comprises a Block Error Rate (BLER) estimator that is configured to estimate a BLER for the physical layer channel based on the first and second channel quality estimates.

9. The apparatus of claim 8, wherein the BLER estimator is configured to determine the BLER further as a function of the number of antennas used for transmitting to the wireless communication apparatus.

10. A wireless communication apparatus configured to use first channel quality estimates determined for a first set of subcarriers in an OFDM signal to derive second channel quality estimates for a second set of subcarriers in the OFDM signal, the wireless communication apparatus comprising:
- a receiver configured to receive reference information on the first set of subcarriers;
- a first channel quality estimator configured to generate the first channel quality estimates in the frequency domain, based on the received reference information;
- a power delay profile calculator configured to compute a power delay profile for the first set of subcarriers; and
- a second channel quality estimator that includes or is operatively associated with a delay spread evaluator having access to stored values defining one or more dispersion threshold values for evaluating a delay spread of the power delay profile;
- wherein the second channel quality estimator is configured to determine the second channel quality estimates either by extrapolating from the first channel quality estimates or as an average of the first channel quality estimates, depending on the delay spread of the power delay profile; and wherein the delay spread evaluator is configured to provide an indication to the second channel quality estimator as to whether it should determine the second channel quality estimates as the average of the first channel quality estimates, or by extrapolating from the first channel quality estimates.

11. A wireless communication apparatus configured to use first channel quality estimates determined for a first set of subcarriers in an OFDM signal to derive second channel quality estimates for a second set of subcarriers in the OFDM signal, the wireless communication apparatus comprising:
   a receiver configured to receive reference information on the first set of subcarriers;
   a first channel quality estimator configured to generate the first channel quality estimates in the frequency domain, based on the received reference information;
   a power delay profile calculator configured to compute a power delay profile for the first set of subcarriers; and
   a second channel quality estimator configured to;
      determine the second channel quality estimates as the average of the first channel quality estimates when the value of a delay spread of the power delay profile is below a first dispersion threshold or above a higher, second dispersion threshold; and
      determine the second channel quality estimates by extrapolating from the first channel quality estimates when the value of the delay spread is between the first and second dispersion thresholds.

12. A wireless communication apparatus configured to use first channel quality estimates determined for a first set of subcarriers in an OFDM signal to derive second channel quality estimates for a second set of subcarriers in the OFDM signal, the wireless communication apparatus comprising:
   a receiver configured to receive reference information on the first set of subcarriers;
   a first channel quality estimator configured to generate the first channel quality estimates in the frequency domain, based on the received reference information;
   a power delay profile calculator configured to compute a power delay profile for the first set of subcarriers; and
   a second channel quality estimator configured to determine the second channel quality estimates either by extrapolating from the first channel quality estimates or as an average of the first channel quality estimates, depending on a delay spread of the power delay profile;
   wherein the apparatus is configured for operation in a Long Term Evolution (LTE) communication network;
   wherein the first set of subcarriers corresponds to a Primary or Secondary Synchronization Signal (PSS or SSS) transmitted by an eNodeB in the LTE network;
   wherein the second set of subcarriers is outside of the first set of subcarriers;
   wherein a Physical Downlink Control Channel (PDCCH) is transmitted on at least the second set of subcarriers; and
   wherein the apparatus is configured to:
      determine the first channel quality estimates from reference signals received via the PSS or SSS;
      extrapolate from or average those first channel quality estimates to obtain the second channel quality estimates for the PDCCH; and
      estimate a Block Error Rate (BLER) for the PDCCH based on at least the second channel quality estimates.

13. A wireless communication apparatus configured to use first channel quality estimates determined for a first set of subcarriers in an OFDM signal to derive second channel quality estimates for a second set of subcarriers in the OFDM signal, the wireless communication apparatus comprising:
   a receiver configured to receive reference information on the first set of subcarriers;
   a first channel quality estimator configured to generate the first channel quality estimates in the frequency domain, based on the received reference information;
   a power delay profile calculator configured to compute a power delay profile for the first set of subcarriers; and
   a second channel quality estimator configured to:
      derive the second channel quality estimates by extrapolating from the first channel quality estimates, during times when a delay spread of the power delay profile is in an intermediate range; and
      derive the second channel quality estimates by averaging the first channel quality estimates, during times when the delay spread is below or above the intermediate range.

* * * * *

UNITED STATES PATENT AND TRADEMARK OFFICE
CERTIFICATE OF CORRECTION

PATENT NO. : 8,385,222 B2  
APPLICATION NO. : 12/723255  
DATED : February 26, 2013  
INVENTOR(S) : Lindoff et al.

Page 1 of 1

It is certified that error appears in the above-identified patent and that said Letters Patent is hereby corrected as shown below:

On the Title Page, in Item (56), under "OTHER PUBLICATIONS", in Column 2, Line 3, delete "Hundary," and insert -- Hungary, --, therefor.

In the Specification:

In Column 9, Line 13, after Equation (4), insert -- , --.

In Column 9, Lines 34-35, after Equation (5), insert -- , --.

In the Claims:

In Column 11, Line 43, in Claim 5, delete "an Long" and insert -- a Long --, therefor.

In Column 13, Line 19, in Claim 11, delete "to;" and insert -- to: --, therefor.

Signed and Sealed this
Eighteenth Day of June, 2013

Teresa Stanek Rea
*Acting Director of the United States Patent and Trademark Office*